United States Patent
Van Nieuwenhuyze et al.

(10) Patent No.: US 12,470,934 B2
(45) Date of Patent: Nov. 11, 2025

(54) NFC TRANSACTION

(71) Applicants: STMicroelectronics Belgium, Diegem (BE); STMicroelectronics (Rousset) SAS, Rousset (FR)

(72) Inventors: Olivier Van Nieuwenhuyze, Wezembeek-Oppem (BE); Alexandre Charles, Auriol (FR)

(73) Assignees: STMicroelectronics (Rousset) SAS, Rousset (FR); STMicroelectronics Belgium, Diegem (BE)

( * ) Notice: Subject to any disclaimer, the term of this patent is extended or adjusted under 35 U.S.C. 154(b) by 206 days.

(21) Appl. No.: 18/065,514

(22) Filed: Dec. 13, 2022

(65) Prior Publication Data
US 2023/0189002 A1  Jun. 15, 2023

(30) Foreign Application Priority Data
Dec. 14, 2021 (FR) .................................. 2113471

(51) Int. Cl.
*H04L 29/06* (2006.01)
*H04W 12/033* (2021.01)
*H04W 12/06* (2021.01)
*H04W 12/47* (2021.01)

(52) U.S. Cl.
CPC ......... *H04W 12/47* (2021.01); *H04W 12/033* (2021.01); *H04W 12/06* (2013.01)

(58) Field of Classification Search
CPC .................................................. H04W 12/47
See application file for complete search history.

(56) References Cited

U.S. PATENT DOCUMENTS

| | | |
|---|---|---|
| 2008/0162312 A1 | 7/2008 | Sklovsky et al. |
| 2014/0019367 A1 | 1/2014 | Khan et al. |
| 2014/0364058 A1 | 12/2014 | Chew |
| 2015/0089586 A1 | 3/2015 | Ballesteros |
| 2015/0236756 A1 | 8/2015 | Ballesteros |

(Continued)

FOREIGN PATENT DOCUMENTS

| | | |
|---|---|---|
| CN | 104603810 A | 5/2015 |
| CN | 105379171 A | 3/2016 |

(Continued)

OTHER PUBLICATIONS

Pourghomi, P., et al., "Toward A Mobile Payment Market: A Comparative Analysis of Host Card Emulation and Secure Element," International Journal of Computer Science and Information Security, (IJCSIS), vol. 13, No. 12, Dec. 2015, 9 pages.

*Primary Examiner* — Jason K Gee
(74) *Attorney, Agent, or Firm* — Slater Matsil, LLP (57) ABSTRACT

In an embodiment a method for implementing a NFC transaction between a mobile terminal and a distant module is disclosed. The terminal includes a processor hosting an application configured to establish the NFC transaction, a near-field communication module, and a secure element distinct from the processor. The method includes storing, by the near-field communication module in the secure element, first data from the distant module, sending, by the near-field communication module, second data to the application notifying it that the first data have been stored in the secure element and requesting, by the application, the first data from the secure element.

18 Claims, 7 Drawing Sheets

(56) References Cited

U.S. PATENT DOCUMENTS

| | | | |
|---|---|---|---|
| 2015/0278798 A1 | 10/2015 | Lerch et al. | |
| 2015/0348007 A1* | 12/2015 | Khan | G06Q 20/321 |
| | | | 705/44 |
| 2016/0275504 A1* | 9/2016 | Koh | G06Q 20/325 |
| 2016/0379203 A1 | 12/2016 | Elhaoussine et al. | |
| 2018/0310157 A1 | 10/2018 | Pan et al. | |
| 2019/0156321 A1* | 5/2019 | Fontaine | G06Q 20/32 |

FOREIGN PATENT DOCUMENTS

| | | | |
|---|---|---|---|
| CN | 105472546 A | 4/2016 | |
| WO | 2015047224 A1 | 4/2015 | |
| WO | WO-2016026025 A1 * | 2/2016 | G06F 21/34 |

* cited by examiner

NFC TRANSACTION

CROSS-REFERENCE TO RELATED APPLICATIONS

This application claims the benefit of French Patent Application No. 2113471, filed on Dec. 14, 2021, which application is hereby incorporated herein by reference.

TECHNICAL FIELD

The present disclosure generally concerns electronic devices, and more particularly electronic devices adapted to processing secret data. More particularly, the present disclosure concerns electronic devices adapted to implementing a near-field communication (NFC), and in particular a NFC transaction, where at least part of the exchanged data are secret data and/or part of the exchanged data are critical data allowing, for example, a method of identification or authentication of a user.

BACKGROUND

Complex electronic devices, such as cell phones, tablet computers, computers, etc. integrate, over time, more and more functionalities and enable to implement digital services in order to integrate at best in everyday life. As an example, certain cell phones, and more particularly smart phones, integrate digital services such as a bank payment service, or also a service of use of public transport tickets, event tickets, an authentication of the user by a remote system (bank, public administration, etc.). To implement such functionalities, the devices may integrate electronic components specific to these functionalities, such as for example secure components which enable to keep/store identification, reference, and authentication information, generally called "credentials", and assets of the digital service provider, motion sensors, a near-field communication module (NFC), etc.

A difficulty resulting from the addition of new functionalities is that secret data and/or critical data are exchanged between different modules of a same electronic device without being protected.

SUMMARY

Various embodiments provide more reliable near-field communications.

Various embodiments provide near-field communications respecting the confidentiality and/or the anonymity of the users of these communications.

Various embodiments provide more reliable NFC transactions.

Various embodiments provide NFC transactions respecting the confidentiality and/or the anonymity of the users of these transactions.

Various embodiments overcome all or part of the disadvantages of known near-field communications.

Various embodiments overcome all or part of the disadvantages of known NFC transactions.

Various embodiments provide a method for implementing a NFC transaction between a mobile terminal and a distant module, the terminal comprising a processor hosting an application establishing the NFC transaction, a near-field communication module, and a secure element distinct from the processor, the method comprising at least the following successive steps:

(a) said near-field communication module ciphers first data sent by the distant module by using a first key supplied by said secure element; and (b) said first application deciphers said first data by using a second key supplied by said secure element.

Another embodiment provides a mobile terminal adapted to implementing a NFC transaction with a distant module, the terminal comprising a processor hosting an application establishing the NFC transaction, a near-field communication module, and a secure element distinct from the processor, the method of implementing the NFC transaction comprising at least the following successive steps:

(a) said near-field communication module ciphers first data sent by the distant module by using a first key supplied by said secure element; and (b) said first application deciphers said first data by using said first key supplied by said secure element.

According to an embodiment, the application is authorized to implement a NFC transaction by interface software, the interface software being software hosted by the processor and executing instructions sent by said application.

According to an embodiment, the application is a system application.

According to an embodiment, the application is a reliable application having received a permanent authorization to implement a NFC transaction.

According to an embodiment, the application has received a temporary authorization to implement a NFC transaction.

According to an embodiment, the secure element delivers the temporary authorization concerning the application to said interface software.

According to an embodiment, if the interface software comprises no authorization concerning said application, then during step (b), the interface software forbids the application to ask the secure element for the key.

According to an embodiment, the secure element obtains the temporary authorization from an external server.

According to an embodiment, the secure element comprises a list of rules indicating the authorization(s) concerning said application, and other applications if the device implements other applications.

According to an embodiment, the first and the second key are identical.

According to an embodiment, if the application is not authorized to implement a NFC transaction, then during step (b), the secure element refuses to supply said second key to said application, and the application cannot decipher said first data.

According to an embodiment, the NFC transaction is a transaction implemented by a near-field communication method.

According to an embodiment, the NFC transaction is a transaction during which the terminal and the distant module are likely to exchange third critical data.

According to an embodiment, the NFC transaction is a bank transaction.

According to an embodiment, step (a) is preceded by a step (c) during which the near-field communication module is capable of detecting that data are critical data.

According to an embodiment, step (a) is preceded by a step (c) during which the near-field communication module detects that the first data comprise critical data.

Another embodiment provides a system comprising a previously-described terminal and a distant module.

Various embodiments provide a method for implementing a NFC transaction between a mobile terminal and a distant module, said terminal comprising a processor hosting an application establishing the NFC transaction, a near-field communication module, and a secure element distinct from the processor, the method comprising at least the following successive steps:

(a) said near-field communication module sends, to said first application, first data sent by the distant module and ciphered by said secure element; and (b) said first application asks said secure element to decipher said first data.

Another embodiment provides a mobile terminal adapted to implementing a NFC transaction with a distant module, said terminal comprising a processor hosting an application establishing the NFC transaction, a near-field communication module, and a secure element distinct from the processor, the method of implementing the NFC transaction comprising at least the following successive steps:

(a) said near-field communication module sends, to said first application, first data sent by the distant module and ciphered by said secure element; and (b) said first application asks said secure element to decipher said first data.

According to an embodiment, the application is authorized to implement a NFC transaction by interface software, the interface software being software hosted by the processor and executing instructions sent by said application.

According to an embodiment, the application is a system application.

According to an embodiment, the application is a reliable application having received a permanent authorization to implement a NFC transaction.

According to an embodiment, the application has received a temporary authorization to implement a NFC transaction.

According to an embodiment, the secure element delivers the temporary authorization concerning the application to said interface software.

According to an embodiment, if the interface software comprises no authorization concerning said application, then during step (b), the interface software forbids the application to ask the secure element for the key.

According to an embodiment, the secure element obtains the temporary authorization from an external server.

According to an embodiment, the secure element comprises a list of rules indicating the authorization(s) concerning said application, and other applications if the device implements other applications.

According to an embodiment, if the application is not authorized to implement a NFC transaction, then during step (b), the secure element refuses to decipher the first data and to send them to said application.

According to an embodiment, the NFC transaction is a transaction implemented by a near-field communication method.

According to an embodiment, the NFC transaction is a transaction during which the terminal and the distant module are likely to exchange third critical data.

According to an embodiment, the NFC transaction is a bank transaction.

According to an embodiment, step (a) is preceded by a step (c) during which the near-field communication module is capable of detecting that data are critical data.

According to an embodiment, step (a) is preceded by a step (c) during which the near-field communication module detects that the first data comprise critical data.

Another embodiment provides a system comprising a previously-described terminal and a distant module.

Various embodiments provide a method for implementing a NFC transaction between a mobile terminal and a distant module, said terminal comprising a processor hosting an application establishing the NFC transaction, a near-field communication module, and a secure element distinct from the processor, the method comprising at least the following successive steps:

(a) said near-field communication module stores, in said secure element, first data sent by said distant module;

(b) said near-field communication module sends second data to said first application to warn it that said first data have been stored in said secure element; and (c) said first application asks said secure element to supply said first data thereto.

Another embodiment provides a mobile terminal adapted to implementing a NFC transaction with a distant module, the terminal comprising a processor hosting an application establishing the NFC transaction, a near-field communication module, and a secure element distinct from the processor, the method of implementing the NFC transaction comprising at least the following successive steps:

(a) said near-field communication module stores, in said secure element, first data sent by said distant module;

(b) said near-field communication module sends second data to said first application to warn it that said first data have been stored in said secure element; and (c) said first application asks said secure element to supply said first data thereto.

According to an embodiment, the application is authorized to implement a NFC transaction by interface software, the interface software being software hosted by the processor and executing instructions sent by said application.

According to an embodiment, if the interface software comprises no authorization concerning said application, then during step (b), the interface software forbids the application to ask the secure element for the key.

According to an embodiment, the application is a system application, or the application is a reliable application having received a permanent authorization to implement a NFC transaction, or the application has received a temporary authorization to implement a NFC transaction, wherein the secure element delivers the temporary authorization concerning the application to said interface software, the secure element having obtained this temporary authorization from an external server.

According to an embodiment, said second data are representative of said first data.

According to an embodiment, said second data are random data.

According to an embodiment, said secure element ciphers said first data.

According to an embodiment, said first data are ciphered with an asymmetrical cipher algorithm.

According to an embodiment, if the application is not authorized to implement a NFC transaction, then during step (b), the secure element refuses to send the first data to said application.

According to an embodiment, the NFC transaction is a transaction implemented by a near-field communication method.

According an embodiment, the NFC transaction is a transaction during which the terminal and the distant module are likely to exchange third secret data.

According to an embodiment, the NFC transaction is a bank transaction.

According to an embodiment, step (a) is preceded by a step (d) during which the near-field communication module is capable of detecting that data are critical data.

According to an embodiment, step (a) is preceded by a step (d) during which the near-field communication module detects that the first data comprise critical data.

Another embodiment provides a system comprising a previously-described terminal and a distant module.

According to a fourth aspect, an embodiment provides a method of implementation of a NFC transaction between a mobile terminal and a distant module, said terminal comprising a processor hosting an application establishing the NFC transaction and interface software executing instructions of said application, a near-field communication module, and a secure element distinct from the processor, the method comprising the following successive steps:
- (a) said application asks the secure element for the authorization to implement the NFC transaction, and the interface software verifies whether said application is authorized to communicate with the secure element;
- (b) said secure element sends a first temporary authorization to the interface software; and
- (c) at least the first time when the near-field communication module receives first data from the distant module, the interface software verifies whether it has received said first temporary authorization, and if it has, the interface software transmit said first data to the application.

Another embodiment provides a mobile terminal adapted to implementing a NFC transaction with a distant module, the terminal comprising a processor hosting an application establishing the NFC transaction and interface software executing instructions of said application, a near-field communication module, and a secure element distinct from the processor, the method of implementing the NFC transaction comprising the following successive steps:
- (a) said application asks the secure element for the authorization to implement the NFC transaction;
- (b) said secure element sends a first temporary authorization to the interface software; and
- (c) at least the first time when the near-field communication module receives first data from the distant module, the interface software verifies whether it has received said first temporary authorization.

According to an embodiment, the interface software is a primary interface layer which is a software interface directly receiving the instructions from said application and which converts these instructions into a series of instructions adapted to different software driving the circuits and components of said terminal.

According to an embodiment, the interface software is a software control layer comprising the software driving the circuits and components of said terminal.

According to an embodiment, the application is authorized to implement a NFC transaction by means of filter interface software, the filter interface software forming part of the interface software.

According to an embodiment, the application is a system application.

According to an embodiment, the application is a reliable application having received a permanent authorization to implement a NFC transaction.

According to an embodiment, the application has received a second temporary authorization to implement a NFC transaction.

According to an embodiment, the secure element delivers the second temporary authorization concerning the application to filter interface software forming part of said interface software, the secure element having obtained this temporary authorization from an external server.

According to an embodiment, if the secure element has not given said first authorization to the interface software, then during step (c), the interface software does not transmit the first data to the application.

According to an embodiment, the NFC transaction is a transaction implemented by a near-field communication method.

According an embodiment, the NFC transaction is a transaction during which the terminal and the distant module are likely to exchange third secret data.

According to an embodiment, the NFC transaction is a bank transaction.

Another embodiment provides a system comprising a previously-described terminal and a distant module.

BRIEF DESCRIPTION OF THE DRAWINGS

The foregoing features and advantages, as well as others, will be described in detail in the following description of specific embodiments given by way of illustration and not limitation with reference to the accompanying drawings, in which.

Like features have been designated by like references in the various figures. In particular, the structural and/or functional features that are common among the various embodiments may have the same references and may dispose identical structural, dimensional and material properties.

DETAILED DESCRIPTION OF ILLUSTRATIVE EMBODIMENTS

For the sake of clarity, only the steps and elements that are useful for an understanding of the embodiments described herein have been illustrated and described in detail. In particular, the detail of the data exchanged during a NFC transaction of the type of that described hereafter is not described. The different NFC communication protocols specific to the described types of NFC transactions are within the abilities of those skilled in the art, and are compatible with the implementation modes described hereafter.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
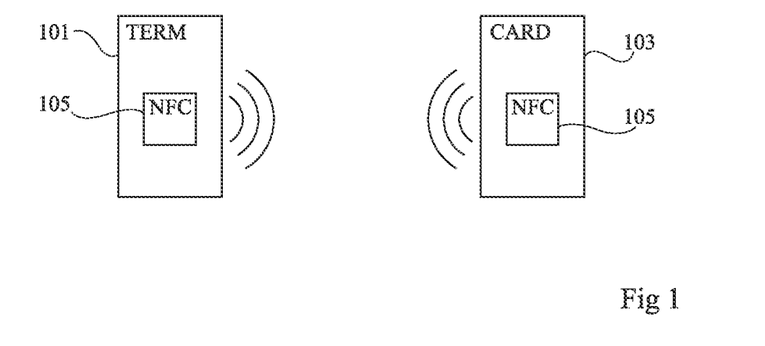
FIG. 1 very schematically shows, in the form of blocks, the implementation of a NFC transaction.

FIG. 1 very schematically illustrates in the form of blocks a NFC transaction between an electronic device 101 (TERM) used as a mobile terminal, or mobile terminal 101, and an electronic device 103 (CARD) used as a distant module, or distant module 103.

Here call transaction a specific communication intended for a commercial and/or monetary operation where a device, terminal 101, is the "payment" terminal which implements the transaction and the other device, distant module 103, is that which accepts or not the transaction. An example of a transaction concerned by the embodiments described hereafter is a bank transaction. Another example of a concerned transaction is the purchase of a transport ticket. Other types of transactions can be envisaged, and the two previously-mentioned examples are not limiting. The NFC transaction concerned herein particularly is a transaction where the two devices exchange critical and/or secret data.

A NFC transaction is a wireless and contactless communication using, for its implementation, a near-field technology, called NFC communication hereafter. Near-field communication (NFC) technologies enable to carry out short-range high-frequency communications. Such systems use a radio frequency electromagnetic field emitted by a device (terminal or reader) to communicate with another device (distant module, transponder or card).

The case of two electronic devices, for example, terminal 101 and distant module 103, is assumed, however all that will be described more generally applies to any system where a transponder detects an electromagnetic field radiated by a reader or terminal. In this type of communication, electronic devices 101 and 103 are positioned within range of each other, that is, at a distance generally shorter than 10 cm. According to another example, devices 101 and 103 are in mechanical contact with each other.

According to applications, for a NFC communication, one of the devices, terminal 101, operates in so-called reader mode while the other, distant module 103, operates in so-called card mode, or the two devices communicate in peer-to-peer mode (P2P). Each device comprises various electronic circuits 105 (NFC) adapted to emitting a radio frequency (RF) signal transmitted by means of an antenna of an oscillating/resonating circuit. The radio frequency field generated by one of the devices, for example, terminal 101, is detected by the other device, for example, distant module 103, which is located within its range and which also comprises an antenna. When terminal 101 emits an electromagnetic field to initiate a communication with distant module 103, this field is captured by distant module 103 as soon as it is within its range. The field is detected by the circuits 105 of the distant module 103 which, if they are at standby, are reactivated. This leads to a variation of the load formed by the circuits 105 of distant module 103 on the resonant circuit for generating the field of terminal 101. In practice, the corresponding phase or amplitude variation of the emitted field is detected by terminal 101, which then starts a protocol of NFC communication with distant module 103. On the side of terminal 101, it is in practice detected whether the amplitude of the voltage across the resonant circuit decreases below a threshold or whether the voltage across the resonant circuit exhibits a phase shift greater than a threshold. Once terminal 101 has detected the presence of distant module 103 in its field, it starts a procedure of establishment of a communication implementing transmissions of requests by terminal 101 and of answers by distant module 103. The transmissions of requests and of answers are described in further detail in relation with FIGS. 3 to 7.

Terminal 101 is an electronic device that may be, for example, fixed or mobile. Terminal 101 is in charge of initiating the communication. As an example, terminal 101 is an electronic device adapted to implementing a transaction application as the terminal of the transaction. According to a more detailed example, terminal 101 is a cell phone, for example, a smart phone, implementing a point-of-sale (POS) application, that is, an application enabling it to implement a transaction as a terminal. According to another example, terminal 101 may be a connected device, such as a smart watch, adapted to implementing a near-field communication, and more particularly a NFC communication.

Distant module 103 is a generally mobile device. According to a preferred embodiment, distant module 103 is a microcircuit card (or chip card), for example, a bank card or a transport card. As a variant, distant module 103 might be a cell phone. Distant module 103 comprises different electronic circuits adapted to implementing various instructions sent by terminal 101, such as for example authentication circuits, cryptography circuits, etc.

In recent systems, a same NFC device may operate in card mode or in reader mode (for example, in the case of a near-field communication between two cellular phones), and may select, according to cases, whether it operates in card mode or in reader mode. According to an example, module 101 may be used as reader or terminal implementing a payment transaction, and, in another case, be used as a card, for example, to validate a transport ticket.

Figure 2:
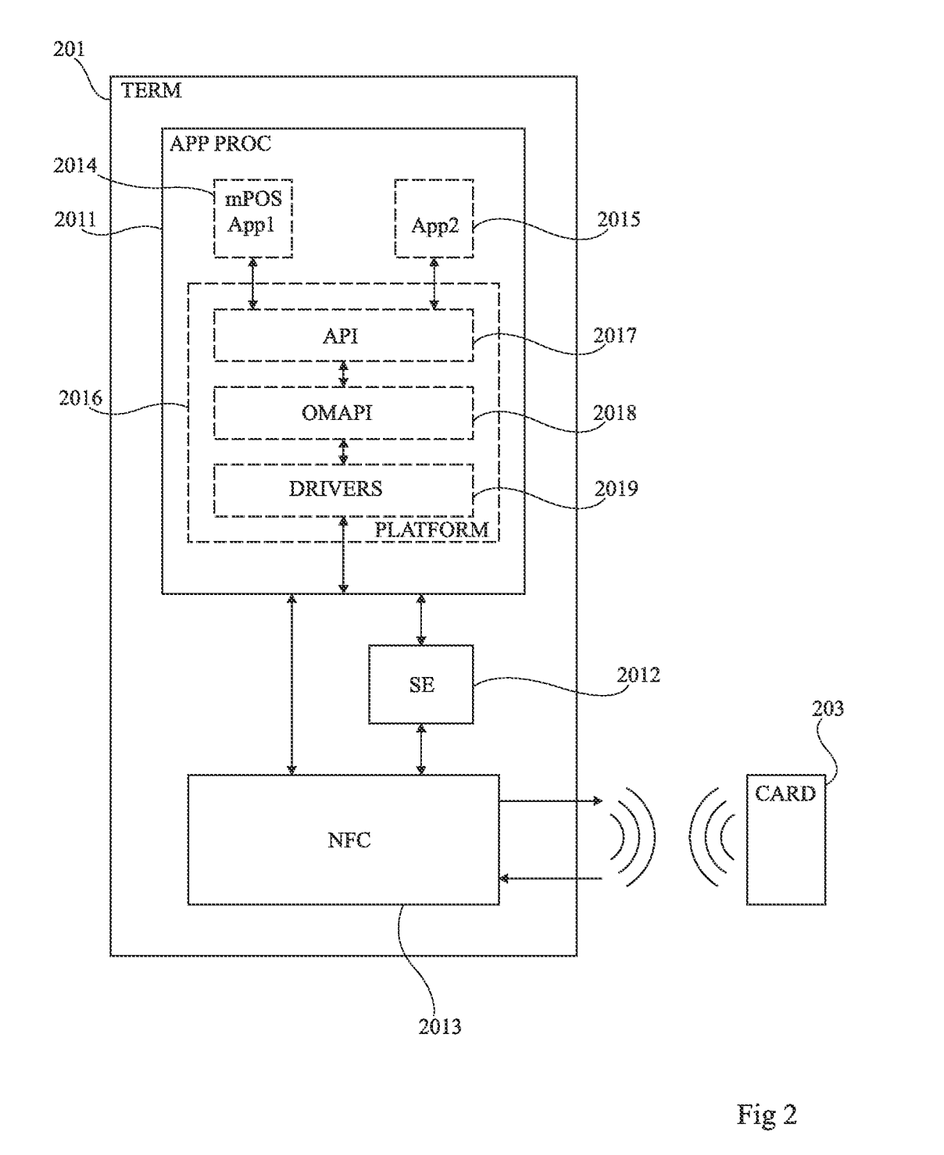
FIG. 2 very schematically shows, in the form of blocks, an embodiment of a mobile terminal capable of implementing an implementation mode of a NFC transaction.

FIG. 2 schematically shows, in further detail, in the form of blocks, an embodiment of a NFC transaction, of the type of that described in relation with FIG. 1, between a terminal device 201 (TERM), or terminal 201, and a distant module 203 (CARD). FIG. 2 illustrates in further detail the hardware (in full lines) and software (in dotted lines) structure of terminal 201, distant module 203 being identical to the distant module 103 described in relation with FIG. 1.

Terminal 201 comprises, at least:
a processor 2011 (APP PROC);
a secure element (SE) 2012; and
a near-field communication module (NFC) 2013.

Processor 2011 is a processor adapted, among others, to implementing a software architecture of terminal 201, described hereafter.

Secure element 2012 is a secure circuit or component, for example, a processor, or a calculation unit, adapted to manipulating secret data, or confidential data. The secure element is distinct from processor 2011. Secure element 2012 may for example implement algorithms of authentication, data ciphering and/or deciphering, cipher and/or decipher key generation, etc. According to an example, secure element 2012 is a secure element embedded in terminal 201 but, according to a variant, secure element 2012 may be a secure element integrated to terminal 203. The advantage of having an embedded or integrated secure element is that this enables to have a high protection level, since the secure element forms part of device loft According to still another variant, secure element 2012 may form part of a secure platform which physically isolates it from the other components of device 201, or secure element 2012 may be combined with processor 2011 while benefiting from a hardware portion which physically isolates it from processor 2011, for example by using a TrustZone-type technology. These last two variants have a lower protection level than the previous variants. According to an embodiment, secure element 2012 is capable of knowing whether a NFC transaction is a transaction during which critical information and data may be exchanged.

Near-field communication module 2013, or NFC module 2013, is an assembly of circuits and of one or a plurality of antennas, enabling terminal 201 to implement a near-field communication and, in particular, a NFC transaction of the type of that described in relation with FIG. 1. The NFC module thus enables to send and to receive data, like the circuits 105 described in relation with FIG. 1. According to an embodiment, the NFC module is capable of detecting that data are critical data, for example, by verifying the type of the sent instruction, and the type of the answer received afterwards, for example based on a lookup table stored in NFC module 2013 or, for example, by counting the number of instructions according to the selection (or the selection answer) of an application. The NFC module might combine the two methods.

These three elements are adapted to communicating together by different communication means. According to an example, processor 2011 is adapted to communicating with NFC module 2013, for example, via a bus of I2C (Inter Integrated Circuit) type, of a bus of SPI (Serial Peripheral Interface) type, or of a bus of UART (Universal Asynchronous Receiver Transmitter) type. According to an example, processor 2011 is adapted to communicating with secure element 2012, for example, via a bus of I2C (Inter Integrated Circuit) type, of a bus of SPI (Serial Peripheral Interface) type. According to an example, secure element 2012 is adapted to communicating with NFC module 2013, for example, via a bus of SWP (Single Wire Protocol) type by using, for example, communication protocol of HCI (Host-Controller Interface) type or a communication protocol of CLT (ContactLESS) type, or, for example, via a shared data memory by using a communication mechanism of IPC (Inter-Process Communication) type. To communicate together, secure element 2012 and NFC module 2013 may, for example, use a communication protocol of VNP (VPP Network Protocol, VPP signifying Virtual Primary Platform) type, such a protocol may be used with an I2C-type or SPI-type bus.

Further, terminal 201, and more particularly processor 2011, is adapted to implementing different types of software enabling it to execute different functionalities, including, more particularly, that of engaging and performing a NFC transaction with another electronic device, such as distant module 203. The software architecture of terminal 201, and more particularly of processor 2011, comprises different applications enabling a user to implement different functionalities and a plurality of interface software layers 2016 (PLATFORM), or interface software 2016 enabling to translate the instructions sent by the applications into instructions interpretable by the different circuits and components of terminal 201, such as secure element 2012 and NFC module 2013.

In FIG. 1, terminal 201 is adapted to implementing at least one application 2014 (mPOS App) having as a functionality, among others, to implement a NFC transaction of the type of that described in relation with FIG. 1 as a terminal. Application 2014 may be a point-of-sale type application. According to an example, terminal 201 may implement one or a plurality of other applications 2015 (App 2). In this description, "application" designates software having its manipulation accessible to the user of terminal 201. To implement the different functionalities of terminal 201, the applications are adapted to using the different circuits and components of terminal 201 by sending instructions to interface software layers 2016.

Interface software layers 2016 comprise:
a primary interface layer 2017 (API);
a filter layer 2018 (OMAPI); and
a layer for controlling 2019 (DRIVERS) the circuits and components of terminal 201.

Primary interface layer 2017 is a software interface directly receiving the orders of operations to be performed from applications 2014 and 2015 and which converts these operations into a series of instructions adapted to the different circuits and components of terminal 201. In other words, if an application sends the order to perform an operation requesting the use of a plurality of a plurality of circuits or components of terminal 201, interface 2017 converts this order into a set of instructions. An operation may be performed by implementing one or a plurality of instructions intended for one or a plurality of circuits or components of terminal 201.

Filter layer 2018 is a software filter interface adapted to authorizing, limiting, or forbidding an application, for example, applications 2014 and 2015 to use all or part of one or a plurality of circuits or components of terminal 201. In other words, filter layer 2018 receives the instructions sent by interface 2017 and decides whether it transmits them or not according to the application which has formulated the initial instruction. Filter layer 2018 may be based on different criteria to authorize or not the access to the circuits and components of terminal 201 to an application. According to an example, filter layer 2018 may authorize the access to one or a portion of a circuit or component of terminal 201 to a first application, and deny this access to a second application.

According to a first example, if the application is a system application, that is, an application generated by the manufacturer of terminal 201, or by the manufacturer or designer of interface software layers 2016, the application may have a permanent authorization to access all the circuits or components, or only circuits and components selected by the manufacturer, and has at least the authorization to implement a NFC transaction. Further, conversely, a system application may have a limited access, permanent or not, to all or part of one or a plurality of circuits or components of terminal 201. Thus, certain portions of circuits or components, or certain circuits or components of terminal 201, may be accessible to system applications only, and an application which does not fulfill this criterion will systematically receive a denial each time it will try to send an instruction to these circuit portions or components, or circuits or components.

According to a second example, the application may be a reliable application having passed different reliability tests with the manufacturer of terminal 201, or with the manufacturer or designer of interface software layers 2016, which has thus permanently authorized it to have access to all or part of the circuits or components of terminal 201. According to an example, the application has at least the authorization to implement a NFC transaction. A reliable application of this type may be considered as a system application, and thus have the same characteristics.

According to a third example, the application may have the possibility of periodically authenticating with a server external to terminal 201 to obtain an authorization of temporary access to all or part of the circuits and components of terminal 201. According to an example, the application has at least the temporary authorization to implement a NFC transaction. In the following description, it will be said that an application is authorized to have access to such a circuit or to such a component of terminal 201 is filter layer 2018 authorizes it the access thereto. According to an example, the authorization of temporary access to the circuits and components of terminal 201 may be kept by interface software 2016, for example, by filter interface 2018, interface software 2016 being for example adapted to implementing the authentication of the application with the external server.

According to a fourth example, a circuit or component of terminal 201, for example, secure element 2012, may be adapted to determining what applications have the authorization to implement one or a plurality of its functions. A circuit or component of terminal 201 may for example supply filter layer 2018 with a list indicating what application is authorized to implement one or a plurality of its functions. According to a variant, this circuit or component may deliver temporary authorizations to all or part of an application, for example, by authorizing a number of uses of one or a plurality of its functions. Filter layer 2018 applies these authorizations at the time when an application sends orders to use one or a plurality of functions of one or a plurality of circuits or components of terminal 201. According to a preferred example, secure element 2012 comprises a list of rules, for example stored in a memory, indicating the authorizations of the different applications implemented by terminal 201.

The control layer 2019 of the circuits and components of terminal 201 is the general software for controlling circuits and components 201, that is, the software driving the circuits and components of terminal 201. In other words, control layer 2019 is the assembly of the programs enabling to implement the instructions delivered by interface 2017. Each circuit or component is associated with control software adapted to implementing it. This control software is commonly called driver software, or "driver".

Figure 3:
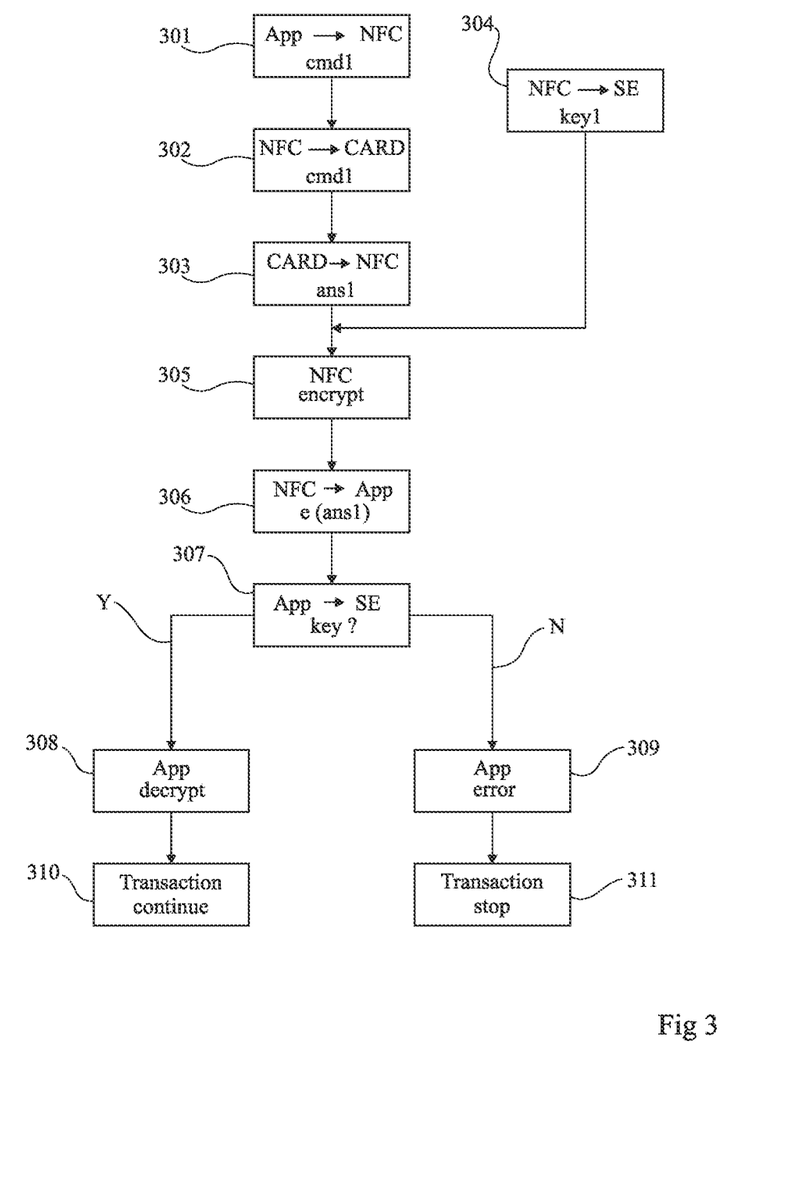
FIG. 3 shows a block diagram illustrating an implementation mode of a NFC transaction.

FIG. 3 is a block diagram illustrating steps of an implementation mode of a method of implementing, or method of performing, a NFC transaction of the type of the NFC transaction described in relation with FIG. 1. These steps are executed by terminal 201 and the distant module 203 described in relation with FIG. 2.

At an initial step 301 (App→NFC cmd1), the application 2014 of terminal 201 decides to implement a NFC transaction with distant module 203. For this purpose, application 2014, once the communication has been established (for example, according to the anticollision standards defined by NFC-Forum or ISO14443 or defined by any other protocol implemented by NFC module 2013), needs to send a first instruction cmd1 to distant module 203 by using NFC module 2013. Application 2014 then transmits a request to interface software layers 2016 to use NFC module 2013 to send instruction cmd1 to distant module 203. Since this operation is a priori not a critical operation, filter layer 2018 authorizes this operation.

At a step 302 (NFC→CARD cmd1), successive to step 301, NFC module has received the instruction cmd1 to be sent to distant module 203 and sends it by using a near-field communication protocol of the type of that previously described.

At a step 303 (CARD→NFC ans1), successive to step 302, distant module 203 has received and processed instruction cmd1 and delivers an answer ans1 to the NFC module 2013 of terminal 201. This answer ans1 is likely to contain critical data. According to an example, if the NFC transaction is a bank transaction, critical bank data are likely to form part of answer ans1 such as, for example, identification data or data enabling to identify a user. According to an embodiment, NFC module 2013 is capable, according to the type of NFC transaction implemented, of determining whether data comprised in answer ans1 are critical data or not. For example, when the NFC module detects that the NFC transaction is a bank transaction, it is capable of understanding that the exchanged data are critical data.

At a step 304 (NFC→SE key1), implemented in parallel with operations 301, 302, or 303, the NFC module 2013 asks secure element 2012 to deliver a cipher key thereto. The NFC module may for example send a specific instruction to ask the secure element for the key. NFC module 2013 and secure element 2012 having a direct communication line, such as previously described, secure element 2012 delivers a cipher key key1 to NFC module 2013. According to an example, NFC module 2013 is capable of assigning a communication channel such as defined in the HCI standard.

At a step 305 (NFC encrypt), successive to step 303, NFC module 2013 having received answer ans1 from distant module 203 and cipher key key1 from the secure element, may cipher answer ans1 by using cipher key key1 to obtain a ciphered answer e(ans1). Thus, the critical data of answer ans1 are protected by ciphering.

At a step 306 (NFC→App e(ans1)), successive to step 305, NFC module 2013 sends ciphered answer e(ans1) to application 2014.

At a step 307 (App→SE key ?), successive to step 306, application 2014 receives ciphered answer e(ans1) and can neither read it nor interpret it without deciphering it. Application 2014 thus sends a decipher key to secure element 2012. This operation being a critical operation, filter interface 2018 verifies whether application 2014 is authorized to send this request to secure element 2012. If application 2014 is authorized (output Y), the next step is a step 308 (App decrypt), otherwise (output N) the next step is a step 309 (App error).

At step 308, application 2014 being authorized, secure element 2012 supplies a decipher key thereto, for example, key key1 if it is a cipher and decipher key, otherwise a decipher key different from key key1. Application 2014 can then decipher answer ans1.

At a step 310 (Transaction continue), successive to step 308, application 2014 may keep on sending instructions and receiving answers from distant module 203 by using the same previously-described mechanism, by using different cipher and/or decipher keys for each answer received from distant module 203. According to a variant, the same cipher key may be used for each answer received from distant module 203 to accelerate the transaction. In this case, at the end of a transaction, the cipher key may be made inefficient, for example, by being suppressed or by being invalidated. It can be considered that the transaction is over when there has been no new instructions for a determined time period, for example, a time period in the order of 500 ms or 1 s or, for example, when the distant module is no longer within range of the terminal, or if an application different from application 2014 is launched. According to a variant, NFC module may also decide from a given time period or a specific instruction, that the NFC transaction no longer comprises critical data and thus stop ciphering the exchanged data.

At step 309, application 2014 has been recognized as not being authorized by filter interface 2018, secure element 2012 delivers no decipher key thereto. Application 2014 thus cannot decipher the answer. By being recognized as non-authorized, application 2014 will not have access to the critical data of the NFC transaction.

At a step 311 (Transaction stop), successive to step 309, since application 2014 does not have access to the critical and/or secret data, application 2014 cannot carry out the NFC transaction, and the NFC transaction stops by itself.

An advantage of this embodiment is that an application which is not authorized by filter interface 2018 cannot have access to the critical data sent by the distant module, since they remain ciphered with a key which is not accessible to the application.

Figure 4:
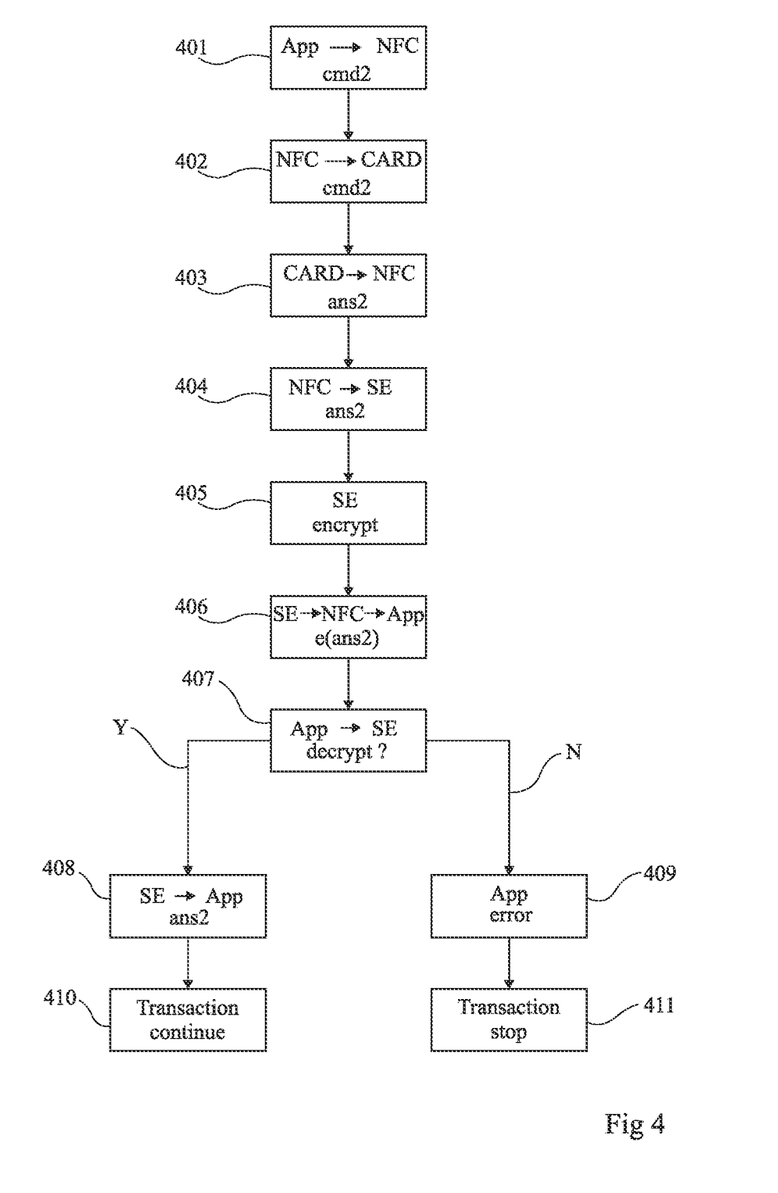
FIG. 4 shows a block diagram illustrating another implementation mode of a NFC transaction.

FIG. 4 is a block diagram illustrating steps of an implementation mode of a method of implementing, or method of performing, a NFC transaction of the type of the NFC transaction described in relation with FIG. 1. These steps are executed by terminal 201 and the distant module 203 described in relation with FIG. 2.

At an initial step 401 (App→NFC cmd2), the application 2014 of terminal 201 decides to implement a NF transaction with distant module 203. For this purpose, application 2014, once the communication has been established (for example, according to the anticollision standards defined by NFC-Forum or ISO14443 or defined by any other protocol implemented by NFC module 2013), needs to send a first instruction cmd2 to distant module 203 by using NFC module 2013. Application 2014 then transmits a request to interface software layers 2016 to use the NFC module to send instruction cmd2 to distant module 203. Since this operation is a priori not a critical operation, filter layer 2018 authorizes this operation.

At a step 402 (NFC→CARD cmd2), successive to step 401, NFC module 2013 has received the instruction cmd2 to be sent to distant module 203 and sends it by using a near-field communication protocol of the type of that previously described.

At a step 403 (CARD→NFC ans2), successive to step 402, distant module 203 has received and processed instruction cmd2 and delivers an answer ans2 to the NFC module 2013 of terminal 201. This answer ans2, like the answer ans1 described in relation with FIG. 3, is likely to contain critical data.

At a step 404 (NFC→SE ans2), successive to step 403, NFC module 2013 sends, to secure element 2012, answer ans2 so that the secure element ciphers it. Step 404 may be optimized, for example, if NFC module 2013 is capable of detecting the critical data among the data of answer ans2, the NFC module may ask the secure element to only cipher the critical data of answer ans2. According to a variant, the NFC module sends answer ans2 to the secure element, and the secure element selects among the data of answer ans2 the critical data to be ciphered.

At a step 405 (SE encrypt), successive to step 404, secure element 2012 ciphers answer ans2 by using a cipher key that it is the only one to know, to obtain a ciphered answer e(ans2). Thus, the critical data of answer ans2 are protected by ciphering.

At a step 406 (SE→NFC→App e(ans2)), successive to step 405, secure element 2012 returns to NFC module 2013 the ciphered answer e(ans2). Then, NFC module 2013 sends the ciphered answer e(ans2) to application 2014.

At a step 407 (App→SE decrypt ?), successive to step 406, application 2014 receives the ciphered answer e(ans2) and cannot read it without deciphering it. Application 2014 thus sends a decipher request to secure element 2012. This operation being a critical operation, filter interface 2018 verifies whether application 2014 is authorized to send this request to secure element 2012. If application 2014 is authorized (output Y), the next step is a step 408 (SE→App decrypt), otherwise (output N) the next step is a step 409 (App error).

At step 408, application 2014 being authorized to communicate with the secure element, it asks secure element 2012 to decipher the answer e(ans2). The latter implements this deciphering and sends answer ans2 to application 2014. According to an alternative embodiment, application 2014 may ask the decipher key to the secure element and decipher the data by itself.

At a step 410 (Transaction continue), successive to step 408, application 2014 may keep on sending instructions and receiving answers from distant module 203 by using the same previously-described mechanism, that is, by having each answer received from distant module 203 ciphered by secure element 2012. According to a variant, a single ciphering may be performed for the first answer(s) received from distant module 203 to accelerate the transaction.

At step 409, application 2014 has been recognized as non-authorized. Application 2014 thus cannot have answer e(ans2) deciphered. By being recognized as non-authorized, application 2014 will not have access to the critical data of the NFC transaction.

At a step 411 (Transaction stop), successive to step 409, since application 2014 does not have access to the critical and/or secret data, application 2014 cannot carry out the NFC transaction, and the NFC transaction stops by itself.

An advantage of this embodiment is that an application which is not authorized by filter interface 2018 cannot have access to the critical data sent by the distant module.

Another advantage of this embodiment is that the management of the decipher key is the responsibility of secure element 2012. The secure element can thus select the decipher key to be used, only use the same key, or change it as often as it desires it.

Figure 5:
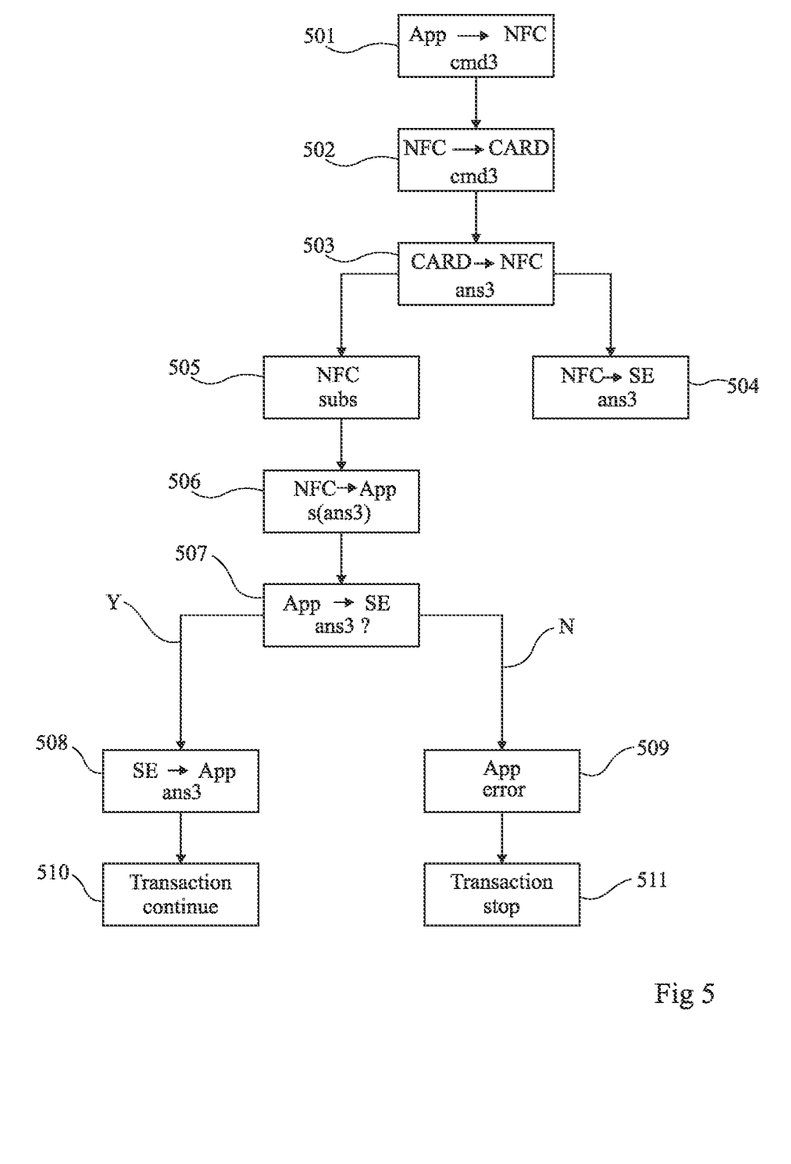
FIG. 5 shows a block diagram illustrating another implementation mode of a NFC transaction.

FIG. 5 is a block diagram illustrating steps of an implementation mode of a method of implementing, or method of performing, a NFC transaction of the type of the NFC transaction described in relation with FIG. 1. These steps are executed by terminal 201 and the distant module 203 described in relation with FIG. 2.

At an initial step 501 (App→NFC cmd3), the application 2014 of terminal 201 decides to implement a NFC transaction with distant module 203. For this purpose, application 2014, once the communication has been established (for example, according to the anticollision standards defined by NFC-Forum or ISO14443 or defined by any other protocol implemented by NFC module 2013), needs to send a first instruction cmd3 to distant module 203 by using NFC module 2013. Application 2014 then transmits a request to interface software layers 2016 to use the NFC module to send instruction cmd3 to distant module 203. Since this operation is a priori not a critical operation, filter layer 2018 authorizes this operation.

At a step 502 (NFC→CARD cmd3), successive to step 501, NFC module 2013 has received the instruction cmd3 to be sent to distant module 203 and sends it by using a near-field communication protocol of the type of that previously described.

At a step 503 (CARD→NFC ans3), successive to step 502, distant module 203 has received and processed instruction cmd3 and supplies an answer ans3 to the NFC module 2013 of terminal 201. This answer ans3, like the answer ans1 described in relation with FIG. 3, is likely to contain critical data.

At a step 504 (NFC→SE ans3), successive to step 503, NFC module 2013 sends, to secure element 2012, answer ans3 so that the secure element stores it. According to a variant, secure element 2012 may store answer ans3 and apply thereto a cipher method, for example, an asymmetrical cipher method. According to another variant, NFC module 2013 sends answer ans3 to secure element 2012, and if the latter detects that some of the data of answer ans3 are critical data, secure element 2012 may store them, and remove them from answer ans3 or replace them with other data before returning answer ans3 to NFC module 2013.

At a step 505 (NFC Subs), successive to step 503, the NFC module prepares data s(ans3) to be sent to application 2014 so that it understands that distant module 203 has sent answer ans3. These data s(ans3) may be data depending on answer ans3, such as for example truncated answer ans3, or ciphered or signed answer ans3, or data independent from answer ans3 such as random data or typical data indicating to application 2014 that an answer has been received.

At a step 506 (NFC→App s(ans3)), successive to step 505, NFC module 2013 sends data s(ans3) to application 2014.

At a step 507 (App→SE ans3 ?), successive to step 506, application 2014 receives data s(ans3) and understands that it has to ask secure element 2012 for answer ans3. Application 2014 thus sends a decipher request to secure element 2012. This operation being a critical operation, filter interface 2018 verifies whether application 2014 is authorized to send this request to secure element 2012. If application 2014 is authorized (output Y), the next step is a step 508 (SE→App decrypt), otherwise (output N) the next step is a step 509 (App error).

At step 508, application 2014 being authorized to communicate with secure element 2012, it asks secure element 2012 for answer ans3. The latter sends answer ans3 to application 2014. According to a variant, if answer ans3 has been ciphered by secure element 2012, application 2014 may request the deciphering of answer ans3 from secure element 2012 or decipher it itself. In this second case, it is considered that a cipher and/or decipher key has been exchanged before the implementation of the NFC transaction to establish a common secret. A technique of the type of the Diffie-Hellman technique may further be used herein.

At a step 510 (Transaction continue), successive to step 508, application 2014 may keep on sending instructions and receiving answers from distant module 203 by using the same previously-described mechanism, by having each answer received from distant module 203 stored by secure element 2012. According to a variant, a single storage may be performed for the first answer(s) received from distant module 203 to accelerate the transaction.

At step 509, application 2014 has been recognized as non-authorized. Application 2014 thus cannot receive answer ans3, whether it has been ciphered or not. By being recognized as non-authorized, application 2014 will not have access to the critical data of the NFC transaction.

At a step 511 (Transaction stop), successive to step 509, since application 2014 does not have access to the critical and/or secret data, application 2014 cannot carry out the NFC transaction, and the NFC transaction stops by itself.

An advantage of this embodiment is that an application which is not authorized by filter interface 2018 cannot have access to the critical data sent by the distant module.

Figure 6:
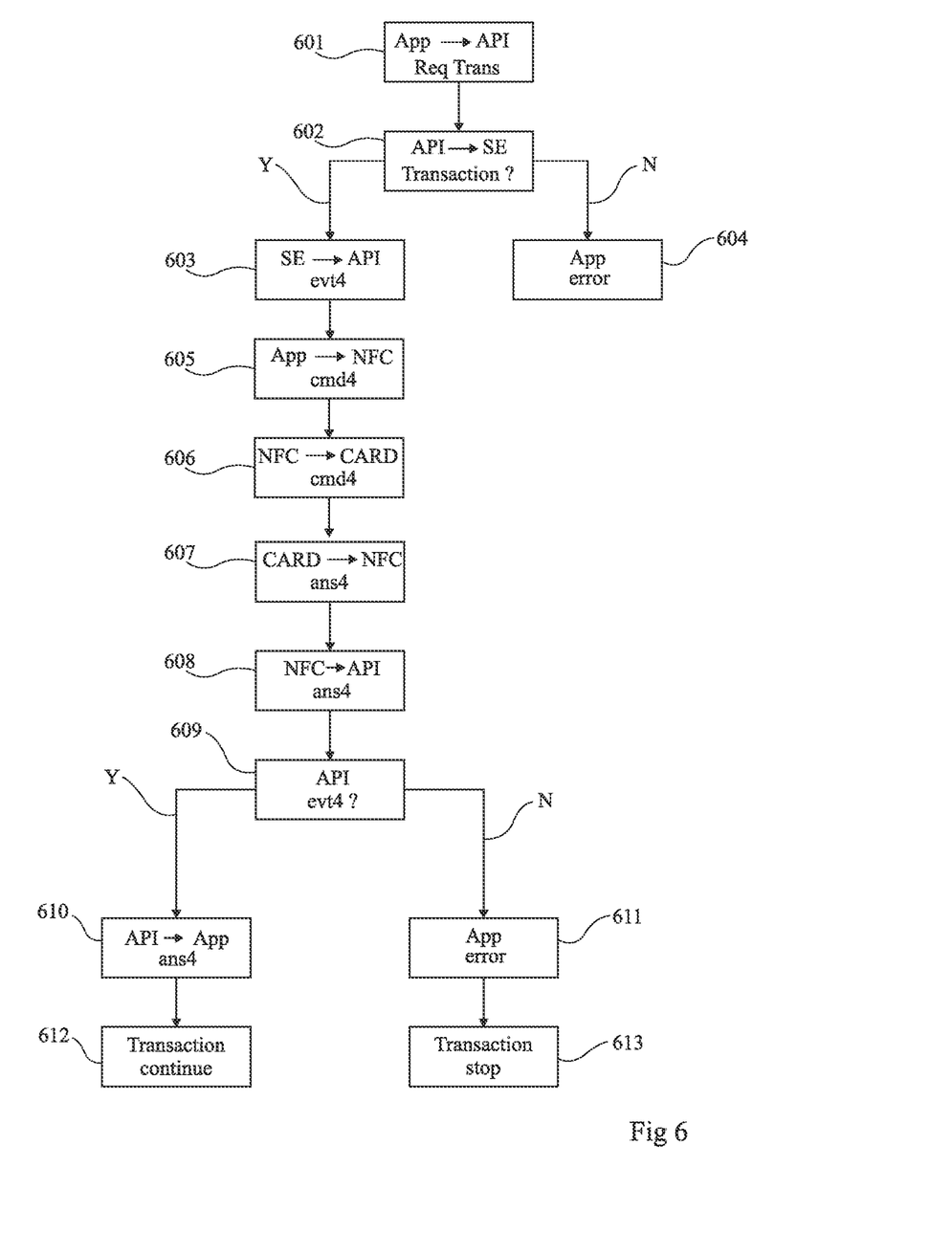
FIG. 6 shows a block diagram illustrating another implementation mode of a NFC transaction.

FIG. 6 is a block diagram illustrating steps of an implementation mode of a method of implementing, or method of performing, a NFC transaction of the type of the NFC transaction described in relation with FIG. 1. These steps are executed by terminal 201 and the distant module 203 described in relation with FIG. 2.

At an initial step 601 (App→API Req Trans), the application 2014 of terminal 201 decides to implement a NFC transaction with distant module 203. For this purpose, application 2014 sends an authorization request to primary interface layer 2017. This request may for example be a request comprising an authentication of application 2014 for secure element 2012. This request may for example comprise data relative to the type of NFC transaction authorized to be implemented by the application, which enables the secure element to filter the types of NFC transactions implemented by an application.

At a step 602 (API→SE Transaction ?), successive to step 601, primary interface layer 2017 sends the request to the filter interface, which verifies whether the application is authorized to be sent to secure element 2012. If application 2014 is authorized (output Y), the next step is a step 603 (SE→API evt4), otherwise (output N), the next step is a step 604 (App error).

At step 604, application 2014 has been recognized as non-authorized and will thus not be able to implement a transaction. Primary interface layer 2017 may for example prevent any request for the starting of a transaction originating from application 2014 or may for example detect the presence of critical data as described hereafter.

At step 603, successive to step 602, secure element 2012 sends to primary interface layer 2017 an instruction evt4, or temporary authorization evt4, according to which application 2014 may implement a NFC transaction. This instruction evt4 may for example concern a single NFC transaction, or a plurality of consecutive NFC transactions, or all the NFC transactions of application 2014. In practice, instruction evt4 may be a software event.

At a step 605 (App→NFC cmd4), consecutive to step 603, but which may be directly consecutive to step 601, application 2014 decides to implement a NFC transaction with distant module 203. Application 2014 then transmits a request to interface software layers 2016 to use NFC module 2013 to send an instruction cmd4 to distant module 203. Since this operation is a priori not a critical operation, primary interface layer 2017 authorizes this operation.

At a step 606 (NFC→CARD cmd4), successive to step 605, NFC module 2013 has received the instruction cmd4 to be sent to distant module 203 and sends it by using a near-field communication protocol of the type of that previously described.

At a step 607 (CARD→NFC ans4), successive to step 606, distant module 203 has received and processed instruction cmd4 and delivers an answer ans4 to the NFC module 2013 of terminal 201. This answer ans4, like the answer ans1 described in relation with FIG. 3, is likely to contain critical data.

At a step 608 (NFC→API ans4), successive to step 607, NFC module 2013 sends, to application 2014, answer ans4, but this sending is intercepted by primary interface layer 2017.

At a step 609 (API evt4 ?), successive to step 608, the instruction evt4 received by primary interface layer 2017 is implemented. If instruction evt4 authorizes the application to implement the NFC transaction (output Y), the next step is a step 610 (API→App ans4), otherwise (output N), the next step is a step 611 (App error). The sending of instruction evt4 may for example be the sending of a software event of transaction type such as defined by the HCI standard, this sending being performed via a dedicated communication channel coupling secure element 2012 and processor 2011. Instruction evt4 may in this case comprise different parameters indicating, for example:

the application authorized to perform a NFC transaction;
the type(s) of concerned NFC transactions; and/or
the number of NFC transactions that the application is authorized to implement.

According to an example, application 2014 may be authorized to implement two bank-type NFC transactions.

At step 610, application 2014 being authorized to communicate with the secure element, primary interface layer 2017 transmits answer ans4 thereto.

At a step 612 (Transaction continue), successive to step 610, application 2014 may keep on sending instructions and receiving answers from distant module 203 by using the same previously-described mechanism. According to a variant, primary interface layer 2017 may verify for each exchange whether application 2014 is authorized to implement a NFC transaction, or primary interface layer 2017 may consider that the authorization of instruction evt4 is valid until the end of the ongoing NFC transaction or for a predetermined time period, or also according to a parameter comprised in instruction evt4.

At step 611, application 2014 has been recognized as non-authorized and is thus not authorized to receive answer ans4. By being recognized as non-authorized, application 2014 will not have access to the critical data of the NFC transaction.

At a step 613 (Transaction stop), successive to step 611, since application 2014 does not have access to the critical and/or secret data, application 2014 cannot carry out the NFC transaction, and the NFC transaction stops by itself.

An advantage of this embodiment is that an application which is not authorized by filter interface 2018 cannot have access to the critical data sent by the distant module.

Figure 7:
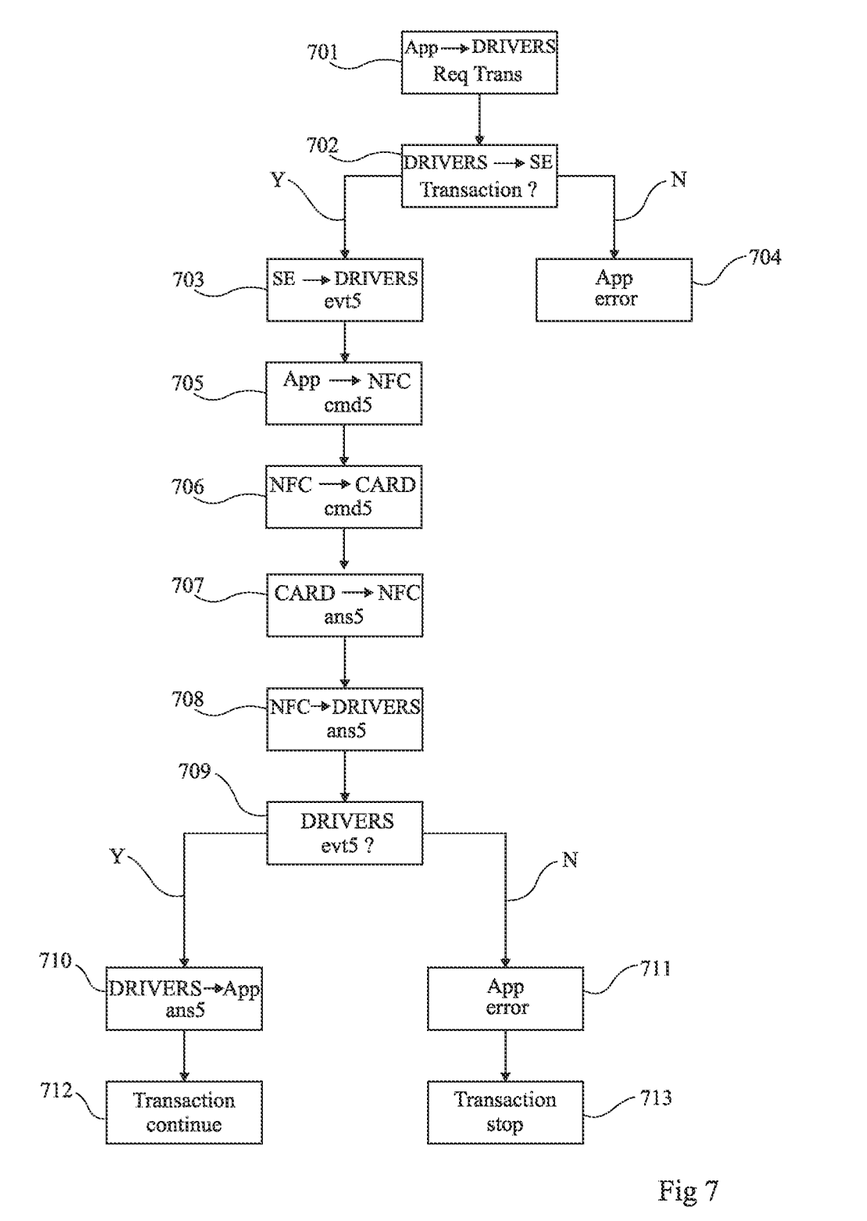
FIG. 7 shows a block diagram illustrating another implementation mode of a NFC transaction.

FIG. 7 is a block diagram illustrating steps of an implementation mode of a method of implementing, or method of performing, a NFC transaction of the type of the NFC transaction described in relation with FIG. 1. These steps are executed by terminal 201 and the distant module 203 described in relation with FIG. 2.

The implementation mode of FIG. 7 is similar to the implementation described in relation with FIG. 6. The difference between these two implementations is that in that of FIG. 7, it is not primary interface layer 2017 that verifies whether the application is authorized to implement the NFC transaction but the control layer 2019 of the circuits and components of terminal 201 which performs this verification. In this case, the method is thus the following.

At an initial step 701 (App→RIVERS Req Trans), the application 2014 of terminal 201 decides to implement a NFC transaction with distant module 203. For this purpose, application 2014 sends a request to control layer 2019. This request may for example be a request of authentication with secure element 2012. This request may for example comprise data relative to the type of NFC transaction authorized to be implemented by the application.

At a step 702 (NFC→CARD cmd5), successive to step 701, control layer 2019 sends the request to secure element 2012. If application 2014 is authorized (output Y), the next step is a step 703 (SE→DRIVERS evt5), otherwise (output N), the next step is a step 704 (App error). According to an alternative embodiment, the verification of the authorization of application 2014 is not performed at step 702, and the next step is directly step 703.

At step 704, application 2014 has been recognized as non-authorized and is thus not able to implement a transaction. Control layer 2019 may for example prevent any request for the starting of a transaction originating from application 2014.

At step 703, successive to step 702, secure element 2012 sends to control layer 2019 an instruction evt5, or temporary authorization evt5, according to which application 2014 may implement a NFC transaction. This instruction evt5 may for example concern a single NFC transaction, or a plurality of consecutive NFC transactions, or all the NFC transactions of application 2014. In practice, instruction evt5 may be a software event. The sending of instruction evt4 may for example be the sending of a transaction-type software event such as defined by the HCI standard, this sending being performed via a dedicated communication channel coupling secure element 2012 and processor 2011. Instruction evt4 may in this case comprise different parameters indicating, for example:
the application authorized to perform a NFC transaction;
the type(s) of concerned NFC transactions; and/or
the number of NFC transactions that the application is authorized to implement.

According to an example, application 2014 may be authorized to implement two bank-type NFC transactions.

At a step 705 (App→NFC cmd5), consecutive to step 703, but that may be directly consecutive to step 701, application 2014 decides to implement a NFC transaction with distant module 203. Application 2014 then transmits a request to interface software layers 2016 to use NFC module 2013 to send an instruction cmd5 to distant module 203. Since this operation is a priori not a critical operation, control layer 2019 authorizes this operation.

At a step 706 (NFC→CARD cmd5), successive to step 705, NFC module 2013 has received the instruction cmd5 to be sent to distant module 203 and sends it by using a near-field communication protocol of the type of that previously described.

At a step 707 (CARD→NFC ans5), successive to step 706, distant module 203 has received and processed instruction cmd5 and delivers an answer ans5 to the NFC module 2013 of terminal 201. This answer ans5, like the answer ans1 described in relation with FIG. 3, is likely to contain critical data.

At a step 708 (NFC→DRIVERS ans5), successive to step 707, NFC module 2013 sends, to application 2014, answer ans5, but this sending is intercepted by control layer 2019 (DRIVERS).

At a step 709 (DRIVERS evt5 ?), successive to step 708, the instruction evt5 received by control layer 2019 (DRIVERS) is implemented. If instruction evt5 authorizes the application to implement the NFC transaction (output Y), the next step is a step 710 (DRIVERS→App ans5), otherwise (output N), the next step is a step 711 (App error).

At step 710, application 2014 being authorized to communicate with secure element 2012, control layer 2018 transmits answer ans5 thereto.

At a step 712 (Transaction continue), successive to step 710, application 2014 may keep on sending instructions and receiving answers from distant module 203 by using the same previously-described mechanism. According to a variant, control layer 2019 may verify for each exchange whether application 2014 is authorized to implement a NFC transaction, or control layer 2019 may consider that the authorization of instruction evt5 is valid until the end of the ongoing NFC transaction or for a predetermined time period. Control layer 2019 (DRIVERS) may further use parameters delivered by instruction evt4.

At step 711, application 2014 has been recognized as non-authorized and is thus not authorized to receive answer ans5. By being recognized as non-authorized, application 2014 will not have access to the critical data of the NFC transaction.

At a step 713 (Transaction stop), successive to step 711, since application 2014 does not have access to the critical and/or secret data, application 2014 cannot carry out the NFC transaction, and the NFC transaction stops by itself.

An advantage of this embodiment is that an application which is not authorized by control layer 2019 cannot have access to the critical data sent by the distant module, the authorization of the application initially originating from secure element 2012.

Various embodiments and variants have been described. Those skilled in the art will understand that certain features of these various embodiments and variants may be combined, and other variants will occur to those skilled in the art. In particular, it is possible for the terminal and the NFC module to only implement such methods for critical NFC transactions, that is, transactions during which critical and/or secret data are exchanged. The NFC module, interface layer 2018, and control layer 2019 may for example be capable of distinguishing whether a NFC transaction is critical or not. This distinction may be performed based on the context in which the transaction is implemented, based on instructions, based on the selection of a specific application, or other.

Finally, the practical implementation of the described embodiments and variations is within the abilities of those skilled in the art based on the functional indications given hereabove.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for implementing a NFC transaction between a mobile terminal and a distant module, the terminal comprising a processor hosting an application configured to establish the NFC transaction, a near-field communication module, and a secure element, wherein the processor, the near-field communication module and the secure element are all distinct from each other, the method comprising:
   storing, by the near-field communication module in the secure element, first data received from the distant module;
   sending, by the near-field communication module, second data to the application notifying it that the first data have been stored in the secure element; and
   in response to receiving the second data, requesting, by the application, the first data from the secure element.

2. The method according to claim 1, further comprising authorizing, by an interface software, the application to implement the NFC transaction, the interface software being a software hosted by the processor and executing instructions sent by the application.

3. The method according to claim 2,
   wherein the application is a system application, or
   wherein the application is a reliable application having received a permanent authorization to implement the NFC transaction, or
   wherein the application has received a temporary authorization to implement the NFC transaction, wherein the secure element delivers the temporary authorization for the application to the interface software, the secure element having obtained this temporary authorization from an external server.

4. The method according to claim 1, wherein the second data are representative of the first data.

5. The method according to claim 1, wherein the second data are random data.

6. The method according to claim 1, further comprising, ciphering, by the secure element, the first data.

7. The method according to claim 6, wherein the first data are ciphered with an asymmetrical cipher algorithm.

8. The method according to claim 1, wherein the NFC transaction is a transaction during which the terminal and the distant module are likely to exchange secret data.

9. The method according to claim 1, further comprising, prior to storing, by the near-field communication module, the first data, detecting, by the near-field communication module, that the first data are critical data.

10. A mobile terminal comprising:
    a processor hosting an application configured to establish a NFC transaction with a distant module;
    a near-field communication module; and
    a secure element,
    wherein the processor, the near-field communication module and the secure element are all distinct from each other,
    wherein the near-field communication module is configured to:
      store first data received from the distant module in the secure element, and
      send second data to the application to notify it that the first data have been stored in the secure element, and
    wherein the application is configured to, in response to receiving the second data, request the first data from the secure element.

11. The terminal according to claim 10, further comprising an interface software hosted by the processor and configured to execute instructions from the application, wherein the interface software is configured to authorize the application to implement the NFC transaction.

12. The terminal according to claim 11,
    wherein the application is a system application, or
    wherein the application is a reliable application having received a permanent authorization to implement the NFC transaction, or
    wherein the application has received a temporary authorization to implement the NFC transaction, wherein the secure element is configured to deliver the temporary authorization for the application to the interface software, the secure element having obtained this temporary authorization from an external server.

13. The terminal according to claim 10, wherein the second data are representative of the first data.

14. The terminal according to claim 10, wherein the second data are random data.

15. The terminal according to claim 10, wherein the secure element is configured to cipher the first data with an asymmetrical cipher algorithm.

16. The terminal according to claim 10, wherein the NFC transaction is a transaction during which the terminal and the distant module are likely to exchange secret data.

17. The terminal according to claim 10, wherein the near-field communication module is configured to detect that the first data are critical data prior to storing the first data.

18. A method for implementing a NFC transaction between a mobile terminal and a distant module, the terminal comprising a processor hosting an application configured to establish the NFC transaction and an interface software, a near-field communication module, and a secure element, wherein the processor, the near-field communication module and the secure element are all distinct from each other, the method comprising:

- storing, by the near-field communication module in the secure element, first data received from the distant module;
- sending, by the near-field communication module, second data to the application notifying it that the first data have been stored in the secure element;
- in response:
- forbidding, by the interface software, the application to request a key from the secure element when the interface software does not have an authorization for the application; or
- requesting, by the application, the first data from the secure element; and
- refusing, by the secure element, to send the first data to the application when the interface software does not have the authorization for the application.

* * * * *